(12) United States Patent
Shima et al.

(10) Patent No.: US 9,156,279 B2
(45) Date of Patent: Oct. 13, 2015

(54) PRINTING SYSTEM, PRINTING DEVICE, AND PRINTING METHOD

(71) Applicant: Seiko Epson Corporation, Tokyo (JP)

(72) Inventors: Shoji Shima, Nagano-ken (JP); Katsutoshi Terashima, Nagano-ken (JP); Tadashi Furuhata, Nagano-ken (JP); Yoshihiro Ueno, Nagano-ken (JP); Akio Takamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 90 days.

(21) Appl. No.: 14/018,538

(22) Filed: Sep. 5, 2013

(65) Prior Publication Data

US 2014/0084049 A1    Mar. 27, 2014

(30) Foreign Application Priority Data

Sep. 27, 2012  (JP) ................. 2012-213716
Mar. 8, 2013   (JP) ................. 2013-046461

(51) Int. Cl.
*B41J 2/21*     (2006.01)
*G06F 3/12*     (2006.01)

(52) U.S. Cl.
CPC ............... *B41J 2/2132* (2013.01); *G06F 3/121* (2013.01); *G06F 3/1204* (2013.01); *G06F 3/1234* (2013.01); *G06F 3/1259* (2013.01); *G06F 3/1261* (2013.01); *G06F 3/1291* (2013.01)

(58) Field of Classification Search
CPC ...... B41J 2/2132; G06F 3/1204; G06F 3/121; G06F 3/1234; G06F 3/1259; G06F 3/1261; G06F 3/1291

USPC .................................. 358/1.1, 1.15; 235/3
See application file for complete search history.

(56) References Cited

U.S. PATENT DOCUMENTS

| | | | |
|---|---|---|---|
| 6,940,615 B1 | 9/2005 | Shima | |
| 7,970,650 B2 | 6/2011 | Tokorotani | |
| 2004/0061896 A1 | 4/2004 | Shimada | |
| 2006/0268335 A1 | 11/2006 | Okada | |
| 2009/0066996 A1 | 3/2009 | Minowa | |
| 2009/0198582 A1 | 8/2009 | Tokorotani | |
| 2009/0222604 A1 | 9/2009 | Morozumi | |
| 2009/0279133 A1* | 11/2009 | Nakatsuka | 358/1.15 |
| 2009/0303534 A1 | 12/2009 | Gotoh et al. | |
| 2010/0027065 A1* | 2/2010 | Koakutsu | 358/1.15 |
| 2011/0063665 A1 | 3/2011 | Hirakawa et al. | |
| 2012/0062936 A1 | 3/2012 | Nakajima | |

FOREIGN PATENT DOCUMENTS

| | | |
|---|---|---|
| EP | 2083404 A2 | 7/2009 |
| EP | 2151749 A2 | 2/2010 |
| JP | 2004-213495 | 7/2004 |
| JP | 2006-007553 | 1/2006 |
| JP | 2007-174022 | 7/2007 |

(Continued)

*Primary Examiner* — Iriana Cruz

(57) ABSTRACT

A first printer 60 has a connection unit that receives print data input from a POS terminal 10, and outputs the print data to and receives the result of printing the output print data from a second printer 20, and a first printer print unit 71 that prints the received print data or data based on the received print data. When the result of printing the print data input to the connection unit is an error, the first printer 60 uses the first printer print unit 71 to print the print data, and outputs the result of printing by the first printer print unit 71 from the connection unit.

9 Claims, 7 Drawing Sheets

(56) References Cited

FOREIGN PATENT DOCUMENTS

| JP | 2008-176574 | 7/2008 |
|---|---|---|
| JP | 2009-187078 | 8/2009 |
| JP | 2009-207090 | 9/2009 |
| JP | 2010-052421 | 3/2010 |
| JP | 2012-096503 | 5/2012 |
| JP | 2012-123597 | 6/2012 |

* cited by examiner

PRINTING SYSTEM, PRINTING DEVICE, AND PRINTING METHOD

CROSS-REFERENCE TO RELATED APPLICATIONS

This application claims priority on Japanese Patent Application Nos. 2012-213716 and 2013-046461, filed Sep. 27, 2012 and Mar. 8, 2013 respectively. The entire disclosures of these Japanese Patent Application documents are incorporated herein by reference.

BACKGROUND

1. Technical Field

The present disclosure relates to a printing system, a printing device, and a printing method.

2. Related Art

Systems that print receipts using a printer connected to a device such as a computer are known from the literature. See, for example, Japanese Unexamined Patent Appl. Pub. JP-A-2009-187078, and JP-A-2012-123597. The system disclosed in JP-A-2012-123597 has a printer that prints receipts and a printer that prints coupons, and prints receipts and coupons using plural printers. Systems enabling replacing a printer with another printer in a system that prints by sending data to a printer from a computer or other host device are also known from the literature. See, for example, JP-A-2012-096503.

However, in order to print using plural printers as described in JP-A-2012-123597 in a system that controls a single printer as described in JP-A-2009-187078, the configuration may be changed by adding another printer, for example. When the system configuration is changed by increasing the number of printers, and printing from one of the printers becomes disabled, another printer may conceivably be substituted to print. This requires changing the configuration of the control device to add the ability to control the substitute printer. As a result, major changes must be made to the entire system, and this can be difficult to achieve. More specifically, to control plural printers as described in JP-A-2009-187078, the control-side computer must first be able to control each printer. For example, a device driver program for controlling each printer must be installed on the control-side computer. Changing the configuration of the control computer is therefore required in order to add a different printer to an existing system that already has a printer, or to replace an existing printer.

SUMMARY

A printing system according to one aspect of the disclosure includes a host device configured to output print data; a first printing device including a connection unit configured to receive the print data output by the host device and to output the print data, and a first print unit configured to print; and a second printing device including an input unit to which the print data output by the connection unit of the first printing device is input, a second print unit configured to print the print data input to the input unit, a print control unit configured to detect an error when an error occurs in the second print unit, and an output unit that outputs the error detected by the print control unit to the connection unit of the first printing device. When an error is output by the output unit of the second printing device and input to the connection unit of the first printing device, the first printing device prints the print data with the first print unit, and reports the printing result by the first print unit as the printing result of the second printing device to the host device.

In a printing system, the print control unit of the second printing device detects a status of the second print unit; the output unit of the second printing device outputs the status detected by the print control unit to the connection unit of the first printing device; and the first printing device determines whether or not to output the print data input to the connection unit to the second printing device based on the status input to the connection unit.

In a printing system, the print data output by the host device includes transaction information; and the first printing device generates a second print data based on the transaction information contained in the print data, and prints the second print data by the first print unit.

In a printing system, the second print data generated based on the transaction information is coupon information, and the first print unit prints a coupon.

In a printing system, the first printing device includes a storage unit configured to store first device information including the first printing device type, and second device information including the second printing device type; and sends the second device information stored in the storage unit to the host device when the host device requests device information from the first printing device.

In a printing system, the host sends print data to be processed by the second printing device to the connection unit of the first printing device. The first printing device receives the print data sent from the host, and sends the received print data to the second printing device. The second printing device receives the print data sent from the first printing device, and prints the received print data with the second print unit.

In a printing system, the first printing device has a data interpreter configured to analyze the print data output by the host device; and a print data storage unit configured to store preset information and print data related to the preset information; the data interpreter determines if the preset information is contained in the print data, and the first print unit prints the print data related to the preset information if the preset information is contained.

In a printing system, the host device is a point-of-sale (POS) terminal configured to process payment information; and the second print unit of the second printing device prints a receipt related to the payment information based on the print data output by the POS terminal.

Another disclosure is a printing device having a connection unit configured to output input print data to an external printing device, and to receive the printing result of the print data; and a print unit configured to print. When the printing result of the print data input to the connection unit is an error, the print unit prints the print data and the connection unit outputs the printing result of the print unit to the host device.

In a printing device, the input print data contains transaction information; and the printing device includes a data generating unit configured to generate data based on the transaction information contained in the input print data.

A printing device comprises a storage unit configured to store device information including the print unit type, and device information for a printing device different from the print unit; and a control unit configured to output the device information stored in the storage unit for the printing device different from the print unit by the connection unit when information requesting the device information of the print unit is input to the connection unit.

The printing device has a device connection unit that is connected to the printing device and outputs data to be processed by the printing Another disclosure is a printing control device having a connection unit configured to receive print data output by a host device and to output the input print data to a printing device or a print processing device different from the printing device; and a control unit configured to receive the printing result of the printing device when the print data is output to the printing device, and when the printing result is an error, outputs the printing result to the print processing device and returns the result of printing the print data by the print processing device as the printing result of the printing device to the host device.

Another disclosure is a printing method including: outputting print data by a host device; receiving print data by a first printing device; outputting the print data to a second printing device by the first printing device; receiving the print data output by the second printing device; outputting error information to the first printing device by the second printing device if an error occurs in the second printing device when printing the print data; printing the print data by the first printing device when the error information for the second printing device is input to the first printing device; and outputting a result of printing by the first printing device as the printing result of the second printing device to the host device.

DESCRIPTION OF EMBODIMENTS

Embodiment 1

A preferred embodiment of the present disclosure is described below with reference to the accompanying figures.

Figure 1:
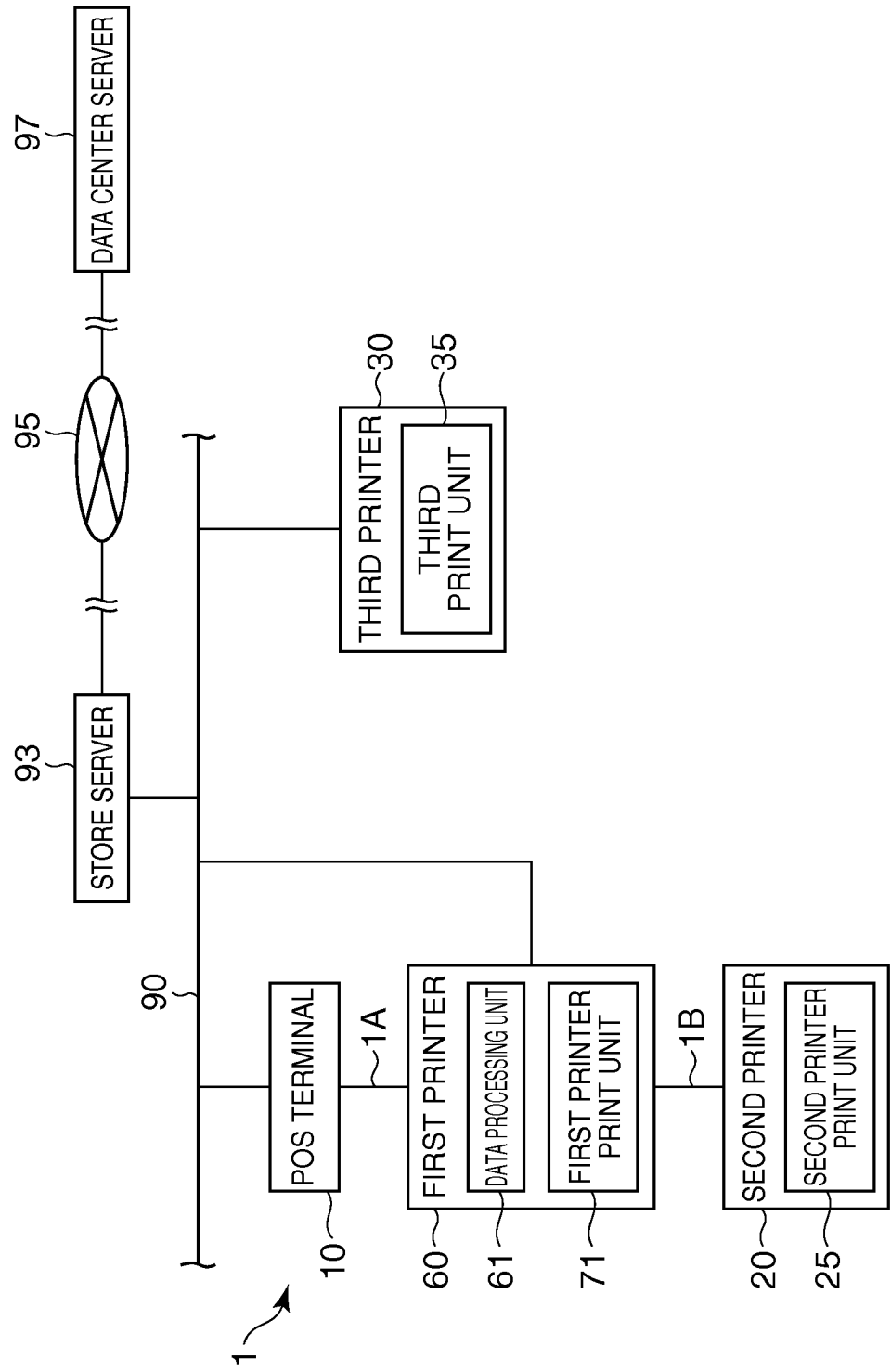
FIG. 1 is a function block diagram of a POS system according to a first embodiment.
Figure 2:
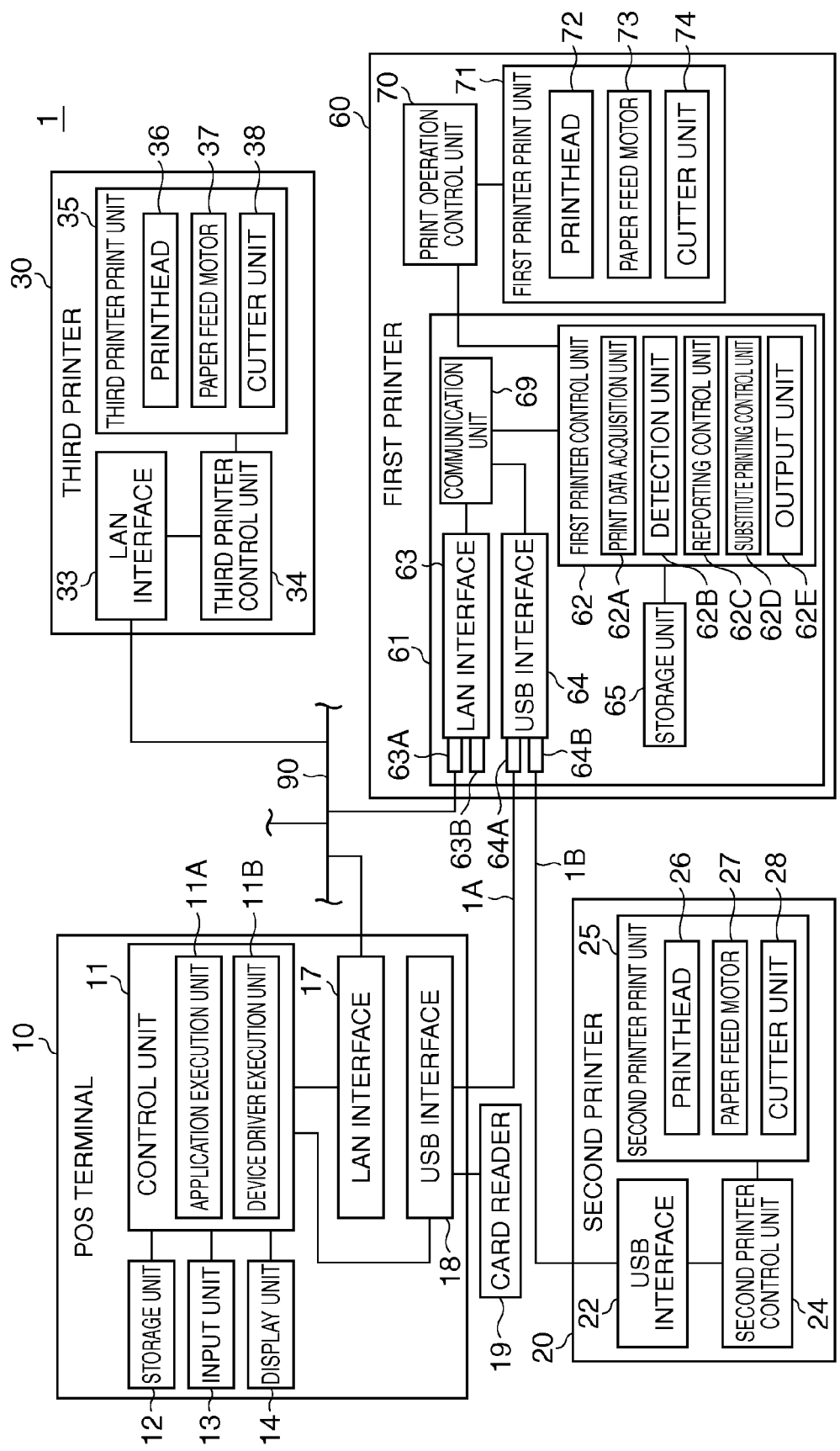
FIG. 2 is a function block diagram of devices in the POS system.

FIG. 1 shows the configuration of a POS system 1 according to the first embodiment of the disclosure, and FIG. 2 is a function block diagram of devices in the POS system 1. The configuration of the POS system 1 is described first below with reference to FIG. 1 and FIG. 2.

The POS (point of sale) system 1 described as an embodiment of sprinting system according to the disclosure includes a first printer 60 (printing device, first printing device) according to the disclosure, a POS terminal 10 (host device), and a second printer 20 (second printing device). The first printer 60 is disposed between the POS terminal 10 and the second printer 20. The POS terminal 10 runs an application program to generate documents and output print instructions. The second printer 20 prints according to the print instructions output by the POS terminal 10.

The first printer 60 is connected through USB cable 1A to the POS terminal 10, and the second printer 20 is connected through USB cable 1B to the first printer 60. In other words, the first printer 60 and second printer 20 are connected in a daisy chain.

The POS terminal 10, first printer 60, and a third printer 30 are each connected to an in-store LAN 90, and can communicate with each other through the in-store LAN 90. A store server 93 is also connected to the in-store LAN 90. The store server 93 is a server that manages the POS system 1 in the store. The store server 93 is also connected to a remote data center server 97 through a communication network 95, which is a wide-area communication network outside the store.

The POS system 1 is used in a shopping center, department store, or other retail business, and may be part of a larger POS system that is used to manage product marketing, product inventory, and product sales in the business. The POS terminal 10 is a device that runs a transaction process related to a purchase transaction by a customer and outputs transaction result information at a particular checkout counter in the business. A POS terminal 10 is typically installed at each of plural checkout counters. The first printer 60 passes data output by the POS terminal 10 to the second printer 20, and the second printer 20 prints a receipt based on data output by the POS terminal 10. The first printer 60 prints coupons based on data output by the POS terminal 10.

The POS terminal 10 includes a control unit 11 that controls other parts of the POS terminal 10, and a storage unit 12, input unit 13, and display unit 14 connected to the control unit 11. The POS terminal 10 has a LAN interface 17 or USB interface 18, or both, as interfaces for connecting external devices.

The control unit 11 includes a CPU and memory such as RAM or ROM, and controls other parts of the POS terminal 10 and executes the functions of a POS terminal 10 by running a program stored in the storage unit 12. The control unit 11 has an application execution unit 11A and device driver execution unit 11B that controls the printers. The application execution unit 11A runs a POS application program and executes a transaction process and receipt printing function. The device driver execution unit 11B runs a device driver program and controls a printer connected through the LAN interface 17 or USB interface 18.

The storage unit 12 stores the programs executed by the control unit 11 and data related to those programs.

The input unit 13 connects to an input device such as a keyboard, and outputs data input from the input device to the control unit 11.

The display unit 14 displays data processed by the control unit 11 and the operating status of the POS terminal 10, for example, on an LCD or other type of display screen. The display unit 14 could include a customer display that displays the purchased products and price information for the customer when the POS terminal 10 executes the transaction process.

The LAN interface 17 has an Ethernet (R) connector or IEEE 802.11 wireless communication circuit, connects to the in-store LAN 90, and sends and receives data with other devices over the in-store LAN 90.

The USB interface 18 includes a USB connector and interface circuit conforming to the USB standard, and handles data communication with the second printer 20 and first printer 60.

A card reader 19 connects to the USB interface 18. The card reader 19 reads information from a card such as a magnetic stripe card to which information is magnetically recorded, or a contactless smart card that has a chip that stores information and can transmit information by radio frequency communication, and outputs the read information to the POS terminal 10. The card reader 19 may read information by radio communication with the RF communication circuit in a cell phone or other mobile terminal, or by optically reading information from a card medium having information recorded as text or a barcode, for example. Using the card reader 19, the POS system 1 captures member information (such as a customer number) identifying a particular customer from the customer or member card of the person making a purchase. In other words, member information is assigned to a customer that has previously registered as a member, and individual customers can be identified by this member information.

A barcode scanner, electronic cash drawer, or other devices can also connect to the USB interface 18, but are not shown in the figure.

The POS terminal 10 may also have an RS-232C or other interface in addition to the LAN interface 17 and USB interface 18.

The application execution unit 11A executes a transaction process related to a product sale based on information input from the input unit 13 or input device connected to the USB interface 18, for example. The transaction process includes registering the products purchased by a customer, calculating the total price, registering the amount received, and calculating the amount of change due. Information read from the product barcode, or a product code, is input during the transaction process to the application execution unit 11A. The application execution unit 11A queries the store server 93 based on the input information, and acquires the product name and product price from a product database (not shown) maintained on the store server 93.

The application execution unit 11A outputs data to be printed and a print instruction to print a receipt for the transaction after the transaction process is completed. If member information is contained in the data output by the application execution unit 11A, the member information is also printed on the receipt.

The application execution unit 11A sends the result of the transaction process and/or data compiling the results of transaction processes during a specific period of time through the in-store LAN 90 to the store server 93. If member information was captured by the card reader 19, the application execution unit 11A sends the transaction process results linked to the member information to the store server 93. The store server 93 acquires the data sent by the POS terminal 10, acquires and compiles data sent by each POS terminal 10 when multiple POS terminals 10 are connected to the store server 93, and stores the data in a storage device not shown. When member information is contained in the data received from the POS terminal 10, the store server 93 may also store the data relationally to the member information. The store server 93 could also send the stored data to the data center server 97 at predetermined times.

The device driver execution unit 11B runs a device driver program that is compatible with the device connected through the LAN interface 17, or the device connected through the USB interface 18. The device driver execution unit 11B in this embodiment is compatible with the second printer 20. The device driver execution unit 11B therefore acquires the print instruction and data output by the application execution unit 11A, and based thereon generates and outputs a print command and print data for the second printer 20.

The second printer 20 is connected through the first printer 60 to the USB interface 18 in this POS system 1, but the device driver program run by the device driver execution unit 11B does not need to be compatible with the first printer 60. The device driver execution unit 11B outputs print commands and print data compatible with the second printer 20, and these print commands and print data are output by the USB interface 18 through a USB cable 1A conforming to the USB standard. The POS terminal 10 therefore operates in the same way as when the second printer 20 is connected to the USB interface 18.

The second printer 20 includes a USB interface 22 (input unit, output unit) and a second printer control unit 24 (printer control unit) that receives commands through the USB interface 22. The second printer control unit 24 receives print command and print data through the USB interface 22, and executes the received print command and controls the second printer print unit 25 to print. The second printer control unit 24 also sends status information describing the current operating status from the USB interface 22 when printing is successful, when an error occurs, and when a status report request is received from the USB interface 22.

The second printer print unit 25 includes a printhead 26, paper feed motor 27, and cutter unit 28. The printhead 26 forms characters and images on roll paper, cut-sheet paper, or other print medium as controlled by the second printer control unit 24. The paper feed motor 27 conveys the print medium as controlled by the second printer control unit 24. The cutter unit 28 cuts the print medium as controlled by the second printer control unit 24.

The second printer 20 is a thermal printer with a thermal printhead that applies heat to thermal paper as the printhead 26.

If data (text data) that specifies the characters to be printed using character codes is included in the print data received by the USB interface 22, the second printer control unit 24 prints the text. More specifically, the second printer control unit 24 reads the font data corresponding to the character codes from a storage unit in the second printer 20, and controls the second printer print unit 25 to print accordingly.

The device driver execution unit 11B generates and outputs print data containing the character codes of the characters to print according to the specifications of the second printer 20 when characters are contained in the data output by the application execution unit 11A.

The print commands and print data output by the POS terminal 10 from the USB interface 18 are first received by the first printer 60 and then forwarded to the second printer 20. The first printer 60 thus relays the data output by the POS terminal 10. The first printer 60 has a function that relays data output by the POS terminal 10 to the second printer 20. The first printer 60 can also have a function for analyzing data received from the POS terminal 10, and sending a print command and print data to the second printer 20 if the data is determined to be data for printing a receipt containing transaction information.

The second printer 20 receives print commands and print data from the first printer 60. The second printer 20 operates in this event based on the received print commands and print data in the same way as when the second printer 20 is connected directly through a USB cable to the POS terminal 10 instead of through the first printer 60. Providing the second printer 20 with a function for operating as controlled by the first printer 60 is therefore not necessary.

The POS system 1 also has a third printer 30 for printing coupons. The third printer 30 has a LAN interface 33 that connects to the in-store LAN 90, and a third printer control unit 34 that receives print data sent by the POS terminal 10 through the LAN interface 33. The third printer 30 is a printer receives data output by the POS terminal 10 for printing a receipt, and prints a coupon related to the receipt.

The third printer 30 receives print commands and print data output by the POS terminal 10, and acquires data for printing a coupon. More specifically, the third printer 30 analyzes the text data (character codes) contained in the data received from the POS terminal 10, accesses the store server 93 based on the analyzed data, and retrieves data for printing a coupon from the store server 93.

The third printer control unit 34 prints a coupon with the print unit 35 based on the print data acquired from the store server 93.

The third printer print unit 35 includes a printhead 36, paper feed motor 37, and cutter unit 38. The printhead 36 prints characters and images on roll paper, cut-sheet paper, or other print medium as controlled by the third printer control unit 34. The paper feed motor 37 conveys the print medium as controlled by the third printer control unit 34. The cutter unit 38 cuts the print medium as controlled by the control unit 34.

The first printer 60 includes a first printer print unit 71 (print unit) that prints on roll paper or cut-sheet paper, print operation control unit 70 (print control unit) that controls the printing operation of the first printer print unit 71, and a data processing unit 61.

The data processing unit 61 includes a control unit 62 (control unit), a LAN interface 63, a USB interface 64, a storage unit 65, and a communication unit 69 (first printer communication unit). The first printer control unit 62 includes CPU, RAM, ROM, and other peripheral circuits and controls parts of the first printer 60 by running a program stored in the storage unit 65.

The LAN interface 63 has an Ethernet (R) connector or IEEE 802.11 wireless communication circuit, can connect to the in-store LAN 90 or other network, and exchanges data with other devices. The LAN interface 63 also has a plurality of connectors 63A, 63B, and can exchange data with each of the other devices connected to the connectors. In this embodiment, for example, the LAN interface 63 exchanges data with the POS terminal 10, third printer 30, store server 93, and other devices connected through the in-store LAN 90 as controlled by the communication unit 69.

The LAN interface 63 also functions as a network hub with a relay function, and can output data received through either connector 63A, 63B from the other connector.

The USB interface 64 includes a USB connector and interface circuit conforming to the USB standard, and handles data communication with the POS terminal 10. The USB interface 64 has a plurality of USB connectors that can connect to a USB cable, and in this embodiment has two connectors 64A, 64B.

In this embodiment, connector 64A is a type-B female connector (receptacle) with the shape and pins specified by the USB standard for a target device connector, and can connect to a standard USB cable. The USB interface 64 has the functions of a USB device controller that operates as a target device as defined in the USB standard. Using this function, the USB interface 64 reports the USB device class ID and device ID to the device connected through a USB cable to connector 64A, and communicates according to the control data sent from the connected device. The connector 64A may be a mini-USB B-connector or a micro-USB B-connector.

The other connector 64B of the USB interface 64 is a type-A female connector with the shape and pins specified by the USB standard for a host device connector, and can connect to a standard USB cable. The USB interface 64 has the functions of a USB host controller that operates as a host device as defined by the USB standard. When a device classified as a target device by the USB standard is connected to connector 64B, the USB interface 64 operates as a host to the connected device, and can recognize the device and communicate with the device. The connector 64B may be a mini-USB A-connector or a micro-USB A-connector. The number of connectors 64B in the USB interface 64 is not specifically limited.

Note that a target device as used herein is an input/output device that connects to a device operating as a host, outputs data to the host as controlled by the host, or outputs data input from the host.

A host as used herein is a computer or other control device that sends commands controlling the I/O devices to the I/O devices operating as target devices.

The USB interface 64 functions as a connection unit connected to the POS terminal 10 and second printer 20 in this embodiment. For example, the POS terminal 10 connects to the first printer 60 through the in-store LAN 90, and the second printer 20 connects to the first printer 60 through the USB interface 64. When thus configured, the LAN interface 63 and USB interface 64 functions as connection units.

The first printer control unit 62 acquires a print command and print data through the LAN interface 63 or USB interface 64, whichever is used as the connection interface. Based on the acquired print data, the first printer control unit 62 outputs data for printing to the print operation control unit 70.

The print operation control unit 70 controls the first printer print unit 71 based on the print data output by the first printer control unit 62, and prints on the roll paper, cut-sheet paper, or other print medium.

The first printer print unit 71 includes a printhead 72 that forms characters and images on the print medium, a paper feed motor 73 that conveys the print medium, and a cutter unit 74 that cuts the print medium, and these units operate as controlled by the print control unit 70 (first printer print control unit).

The first printer 60 may be an inkjet printer or thermal printer, for example. More specifically, the printhead 72 may be an inkjet printhead that ejects four colors of ink, CMYK, onto the printing surface of the print medium to form characters and images, for example, or a thermal head that applies heat to the printing surface of the print medium.

When configured as an inkjet printer, the first printer 60 is suited to printing graphic data (image data). In this embodiment the first printer control unit 62 generates image data by page unit specifying the position, size, and color of the characters and images printed on the print medium, and outputs this image data to the print control unit 70.

When the first printer 60 is a thermal printer, the first printer 60 is suited to printing text data. In this configuration the first printer control unit 62 outputs data containing the character codes of the characters to print on the print medium to the print operation control unit 70. The print operation control unit 70 then reads the font data corresponding to the character codes from a storage unit not shown of the print operation control unit 70, and controls the first printer print unit 71 to print.

When a problem with a part of the first printer print unit 71 is detected, or a problem in a process executed by the print operation control unit 70 is detected, the print operation control unit 70 reports an error to the first printer control unit 62. The first printer control unit 62 may also be configured so that it can communicate with the print operation control unit 70 to detect a problem in the print operation control unit 70 or first printer print unit 71.

The first printer control unit 62 includes a print data acquisition unit 62A, a detection unit 62B, a reporting control unit 62C, a substitute printing control unit 62D, and an output unit 62E. The detection unit 62B detects errors in the second printer 20 and print operation control unit 70. The reporting control unit 62C controls sending an error report to the POS terminal 10 when the detection unit 62B detects an error. The substitute printing control unit 62D controls a substitute printing operation when an error is detected.

The print data acquisition unit 62A acquires the print commands and print data sent by the POS terminal 10 to the second printer 20. When the POS terminal 10 is connected to the USB interface 64 as shown in FIG. 1 and FIG. 2, the print data acquisition unit 62A receives and acquires the print data input to the USB interface 64 through the communication unit 69. The print data acquisition unit 62A may also receive print data sent to another printer by the POS terminal 10 through the in-store LAN 90.

The print data acquisition unit 62A temporarily stores the print commands and print data sent from the POS terminal 10 to the storage unit 65, and outputs the print commands and print data to the second printer 20.

The print data acquisition unit 62A analyzes text data (character codes) contained in the data received by the communication unit 69. When specific preset characters or strings are detected in the text data, the print data acquisition unit 62A accesses the store server 93 and acquires data to be printed based on the detected characters or string. The data to be printed in this event is print data for a coupon. The first printer 60 thus prints a coupon based on the data output by the POS terminal 10 for printing a receipt.

For example, when an error occurs in the second printer 20, and the second printer 20 outputs an error report, the detection unit 62B detects an error in the second printer 20 as a result of receiving this error report.

The detection unit 62B also detects errors by communicating command data with the print operation control unit 70. More specifically, the detection unit 62B detects a print operation control unit 70 error by receiving an error report output by the print operation control unit 70 when a problem occurs in the first printer print unit 71 or the control operation of the print operation control unit 70.

The reporting control unit 62C has a function for reporting printing results to the POS terminal 10. The reports output by the reporting control unit 62C are the same as the reports output by the second printer 20 to the POS terminal 10 when the second printer 20 is connected directly to the POS terminal 10. The POS terminal 10 therefore receives the same report as when the second printer 20 is directly connected.

The conditions for sending a report to the POS terminal 10 are preset in the reporting control unit 62C.

Conditions for the reporting control unit 62C to report to the POS terminal 10 include the following.

(1) Reporting completion of printing (printing successful) when the second printer 20 prints a receipt (2) Reporting completion of printing (printing successful) when the second printer 20 cannot print a receipt due to an error, and the receipt is printed by another printer (first printer print unit 71 or third printer 30 in this embodiment)

(3) Reporting an error when the second printer 20 cannot print a receipt due to an error, and the receipt also cannot be printed by another printer (first printer print unit 71 or third printer 30 in this embodiment)

The conditions that can be set are not limited to the foregoing, and conditions including the cumulative operating time of each printer connected to the first printer 60, frequency of use, printer location, connection interface, printing speed, and color printing compatibility or incompatibility.

These conditions are preset, and data defining the conditions is stored in the storage unit 65. Based on data stored in the storage unit 65, the reporting control unit 62C determines if an error detected by the detection unit 62B satisfies the condition for sending an error report, and based on the result of this decision controls the communication unit 69 to send an error report through the USB interface 64 to the POS terminal 10. This error report could relay the error report command received from the second printer 20 through the USB interface 64, or an error report command generated by the reporting control unit 62C. The error report could also report that an error occurred, or report that the print job output by the POS terminal 10 could not be completed.

When the detection unit 62B detects a second printer 20 or prints operation control unit 70 error, the substitute printing control unit 62D executes a substitute printing process. This process drives another printer to print instead of the printer in which an error was detected (the second printer 20 or print operation control unit 70). For example, if the detection unit 62B detects an error in the second printer 20, the substitute printing control unit 62D causes the print operation control unit 70 to print the receipt based on the print command and print data sent by the POS terminal 10 to the second printer 20. The substitute printing control unit 62D could alternatively substitute the third printer 30 for the second printer 20 to print the receipt.

The first printer 60 has a mechanical assembly embodying the first printer print unit 71, a main circuit board not shown to which the print operation control unit 70 is disposed, and the data processing unit 61 as a discrete circuit board separate from the main circuit board. More specifically, the first printer control unit 62, LAN interface 63, USB interface 64, storage unit 65, and communication unit 69 are mounted on a circuit board separate from the main board, and connect to the print operation control unit 70 through an inter-board interface.

Figure 3:
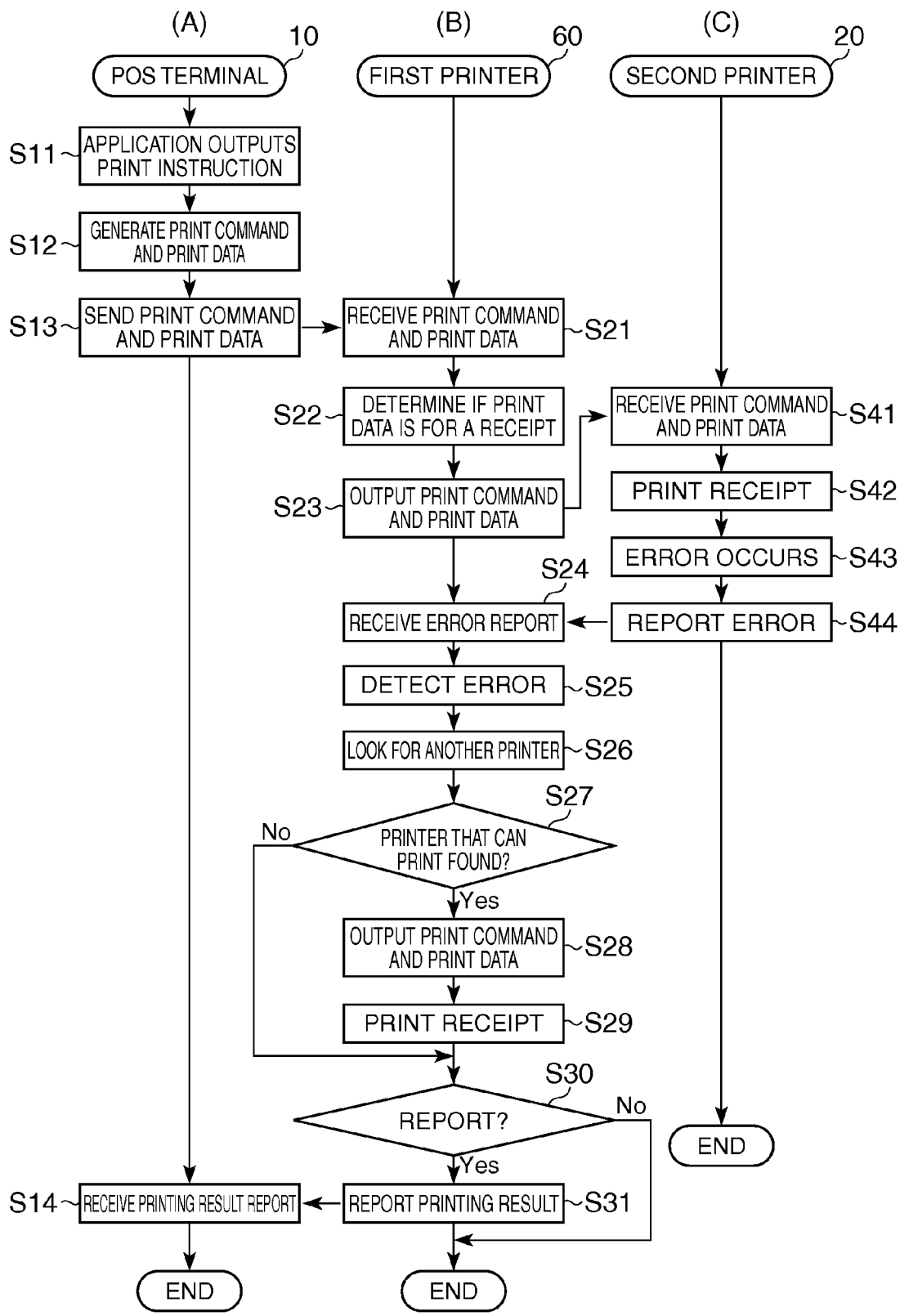
FIG. 3 is a flow chart showing the operating sequence of parts of the first embodiment.

FIG. 3 is a sequence diagram showing the operation of parts of the POS system 1, column (A) showing the operation of the POS terminal 10, (B) showing the operation of the first printer 60, and (C) showing the operation of the second printer 20. FIG. 3 describes operation when an error is detected when the second printer 20 prints a receipt. FIG. 3 shows an example in which the first printer 60 prints the receipt when a second printer 20 error is detected.

When the application execution unit 11A executes a transaction process and outputs a print instruction for a receipt (step S11), the device driver execution unit 11B generates a print command and print data for the second printer 20 (step S12). The device driver execution unit 11B sends the generated print command and print data from the USB interface 18 to the first printer 60 (step S13).

The print data acquisition unit 62A of the first printer 60 receives the print command and print data sent from the POS terminal 10 through the USB interface 64, and temporarily stores the received command and data in the storage unit 65 (step S21). The print data acquisition unit 62A then determines that the data stored in the storage unit 65 is data related to printing a receipt (is data containing transaction information, for example) (step S22). The print command and print data is then output from the USB interface 64 to the second printer 20 (step S23). If the print data acquisition unit 62A determines that the data stored in the storage unit 65 is not data related to printing a receipt, the data could alternatively be printed by the print operation control unit 70, for example.

The second printer control unit 24 of the second printer 20 receives the print command and print data from the first printer 60 (step S41), and prints a receipt (step S42).

When an error occurs in the second printer 20 (step S43), the second printer control unit 24 outputs an error report (command) indicating that an error occurred from the USB interface 22 (step S44). Errors occurring in the second printer 20 include, for example, running out of paper, overheating, or a mechanical problem in the print unit 25, and software errors in the second printer control unit 24.

The detection unit 62B of the first printer 60 receives the error report output by the second printer 20 (step S24), and detects that an error occurred in the second printer 20 (step S25).

The substitute printing control unit 62D then looks for a printer that can substitute for the second printer 20 to print (step S26). The substitute printing control unit 62D includes the third printer 30 and the print operation control unit 70 of the first printer 60 as substitute printers. When there are multiple printers that can print in place of the second printer 20, the printers that can be used are evaluated in a predetermined order of priority. If one of the printers is determined usable, the substitute printing control unit 62D determines there is a printer that can be used and stops looking.

The substitute printing control unit 62D then determines if there is a printer that can substitute for the second printer 20 (step S27). If there is (step S27 returns YES), the output unit 62E sends the print command and print data stored in the storage unit 65 to the substitute printer (step S28). Because the first printer print unit 71 prints a receipt in place of the second printer 20 in the example shown in FIG. 3, the output unit 62E outputs the print command and print data to the print operation control unit 70. The print command and print data can be converted to a format compatible with the selected printer in step S27. The print operation control unit 70 then controls the first printer print unit 71 to print the receipt (step S29), and control goes to step S30.

If a printer that can substitute for the second printer 20 and print is not found (step S27 returns NO), the reporting control unit 62C goes directly to step S30.

Based on the conditions preset in the data stored in the storage unit 65, the reporting control unit 62C determines in step S30 whether or not to report the printing result to the POS terminal 10. If the printing result is reported (step S30 returns YES), the reporting control unit 62C sends the printing result to the POS terminal 10 through the USB interface 64 (step S31).

The POS terminal 10 then receives the report through the USB interface 18 (step S14). If the report indicates printing was completed (successful printing), the POS terminal 10 proceeds to the next operation. If an error was reported, a warning informing the operator of the POS terminal 10 of the error is issued. The report received by the POS terminal 10 is the same command or data that the second printer 20 outputs to the POS terminal 10. The POS terminal 10 can therefore understand the content of the report using a function of the device driver execution unit 11B.

If the reporting control unit 62C determines not to send a report to the POS terminal 10 (step S30 returns NO), the process ends.

The disclosure is not limited to the example shown in FIG. 3, and the first printer 60 may print a coupon when an error occurs while the first printer print unit 71 prints a coupon and printing the coupon is interrupted. More specifically, the print command and print data for printing a coupon may be output to the second printer 20 and the coupon printed by the second printer 20. When an error occurs in one printer in this POS system 1, the first printer control unit 62 can thus continue printing by substituting another printer.

FIG. 3 describes a configuration in which the first printer 60 detects an error (step S25) when a second printer 20 error is reported (step S44). Alternatively, the second printer 20 could output a status report when printing starts and when printing ends, and the first printer 60 could receive this status report and based thereon determine if a second printer 20 error occurred. In this instance, the first printer 60 outputs a status report based on the printing result of the first printer print unit 71 to the POS terminal 10 in the same way as the second printer 20 outputs a status report (step S31).

In addition, when the first printer 60 outputs print data to the second printer 20 in step S23, the first printer 60 could determine whether or not to output the print data to the second printer 20 based on a status report already received from the second printer 20. For example, the first printer 60 does not output the print data to the second printer 20 if the second printer 20 reported an error or is offline, and outputs the print data to the second printer 20 only if the second printer 20 is in a normal standby mode. Because print data is output according to the status of the second printer 20 in this instance, another printer can be more quickly selected and substitute print instead of the second printer 20.

As described above, the POS system 1 according to the first embodiment of the disclosure has a POS terminal 10 that outputs print data, a first printer 60, and a second printer 20. The first printer 60 has a connection unit that receives print data output from the POS terminal 10 and outputs the input print data. The first printer 60 also has a print unit prints the print data output by the POS terminal 10 or data based on the print data output by the POS terminal 10.

The second printer 20 has a USB interface 22 that receives print data output from the connection unit of the first printer 60 and reports errors to the connection unit of the first printer 60. The second printer 20 also has a second printer control unit 24 that prints the input print data and detects if an error occurs while printing the print data.

When an error output from the second printer 20 is input to the connection unit of the first printer 60, the first printer 60 prints the print data with the first printer print unit 71. The first printer 60 also reports the result of printing by the first printer print unit 71 to the POS terminal 10 as the printing result of the second printer 20. The first printer 60 can therefore be connected to the POS terminal 10 and two printers can be used without changing the function of the POS terminal 10 that controls the second printer 20. For example, the first printer 60 can print instead of the second printer 20 when an error is detected in the second printer 20.

Furthermore, because the first printer control unit 62 can be used to print instead of the second printer 20 without depending on control by the POS terminal 10, there is no need to add new control functions to the POS terminal 10 and second printer 20. A first printer 60 can therefore be added without greatly changing the configuration of the POS terminal 10 by simply adding the first printer 60 to a system to which the POS terminal 10 and second printer 20 are connected. A substitute printing function can also be achieved by the added first printer 60 when an error is detected.

When data that could not be printed by the second printer 20 is printed by the first printer print unit 71, the first printer control unit 62 sends the same report to the POS terminal 10 as when printing is completed by the second printer 20. The POS terminal 10 can receive this printing status report, and can control operation in the same way as when the second printer 20 is directly connected to the POS terminal 10. A printing system that can maintain the ability of the POS terminal 10 to detect printing results, and can print using a substitute printer when an error occurs in the second printer 20, can therefore be achieved without greatly changing the configuration of the POS terminal 10.

When data that could not be printed by the second printer 20 also cannot be printed by the first printer print unit 71, the first printer control unit 62 reports to the POS terminal 10 that printing failed or an error occurred in the second printer 20.

The POS terminal 10 can receive this printing status report, and execute an appropriate process when the output data is not printed. A system that can substitute another printer when an error occurs in the second printer 20 can therefore be achieved without greatly changing the configuration of the POS terminal 10.

The first printer 60 has a connection unit that receives print data, outputs the print data, and receives the result of printing the output print data, and a first printer print unit 71 that prints the input print data or data based on the print data. When the input to the connection unit is an error, the first printer 60 prints the print data with the first printer print unit 71 and outputs the result of printing by the print unit 71 from the connection unit. As a result, the first printer 60 can be connected between the POS terminal 10 and second printer 20. The first printer 60 can therefore print by means of the second printer 20, and when a second printer 20 error occurs, can print in place of the second printer 20 and output the printing result to the POS terminal 10.

Embodiment 2

Figure 4:
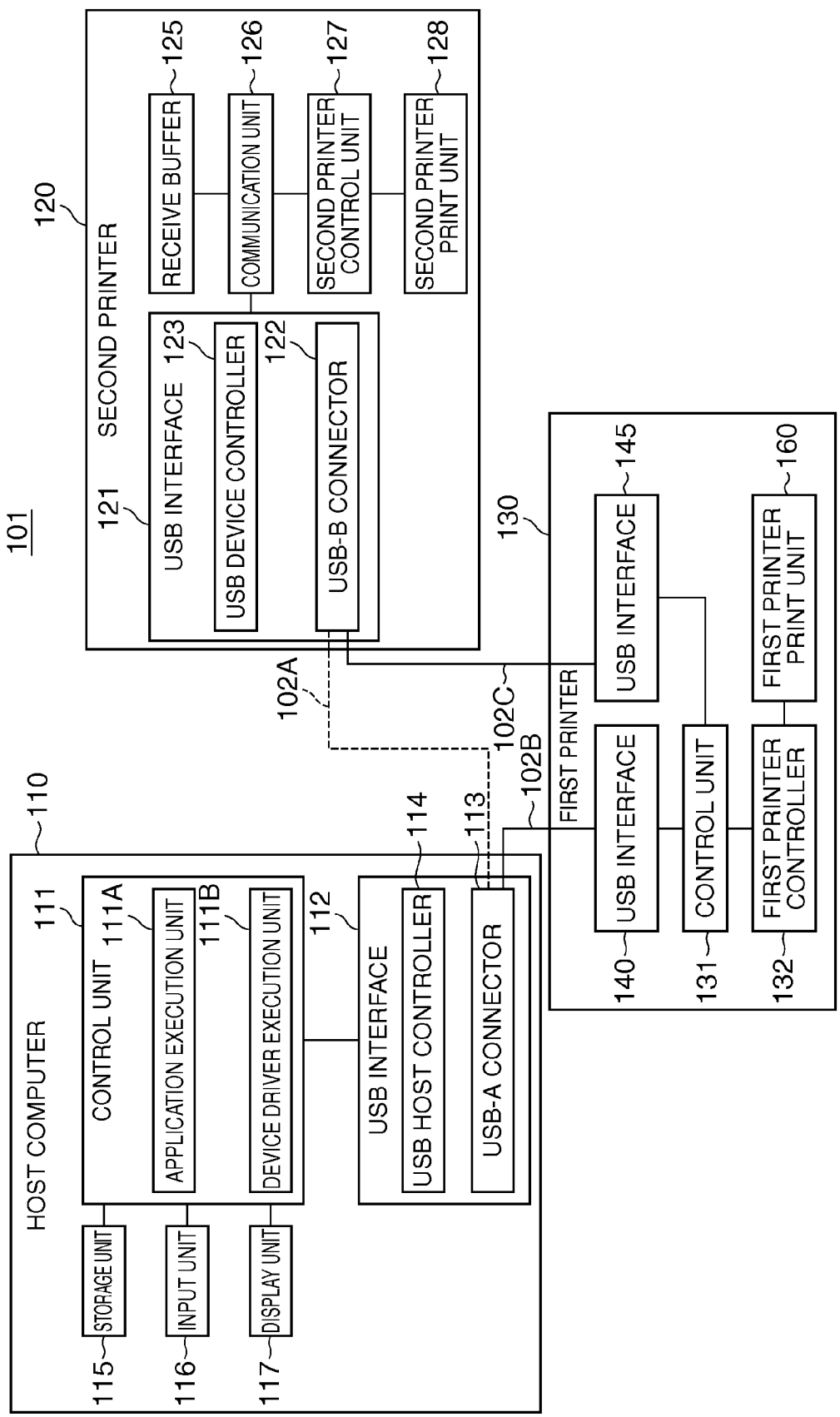
FIG. 4 is a block diagram of a printing system according to a second embodiment.

FIG. 4 shows the configuration of a printing system 101 according to a second embodiment of the disclosure.

The printing system 101 shown in FIG. 4 includes a first printer 130 (printing device, first printing device), a host computer 110 (host, host device), and second printer 120 (printing device, second printing device). The first printer 130 is installed between the host computer 110 and second printer 120. The host computer 110 runs an application program, generates documents, and outputs print commands. The second printer 120 prints according to the print commands output by the host computer 110. The host computer 110 and second printer 120 can also be directly connected 1:1 through a USB cable 102A. When connected directly, the second printer 120 receives commands and data output by the host computer 110 and prints.

This printing system 101 is a system without the USB cable 102A connecting the host computer 110 and the second printer 120. More specifically, the first printer 130 is connected to the host computer 110 through USB cable 100B, and the first printer 130 and the second printer 120 are connected to each other through USB cable 102C. The first printer 130 and second printer 120 are thus daisy chained to the host computer 110 in this printing system 101.

The host computer 110 includes a control unit 111, a storage unit 115, an input unit 116, and a display unit 117. The host computer 110 also has a USB interface 112 as an interface to which external devices connect. The USB interface 112 includes a USB-A connector 113, and a USB host controller 114 that handles communication with the device connected through a USB cable to the USB-A connector 113 according to a specific protocol.

The control unit 111 includes a CPU and memory such as RAM or ROM, and centrally controls other parts of the host computer 110 by running a program stored in the storage unit 115.

The application execution unit 111A of the control unit 111 executes an application program stored in the storage unit 115. For example, the control unit 111 runs a POS application program and operates as a POS terminal. The control unit 111 executes a data process related to a product sale based on data input by the input unit 116, and outputs data for printing a receipt showing the result of the product sale process together with an instruction to print.

The control unit 111 also has a device driver execution unit 111B. The device driver execution unit 111B runs a device driver program stored in the storage unit 115, and controls devices connected to the host computer 110. The host computer 110 in this embodiment of the disclosure corresponds to a device that connects through a USB interface 112, and can execute the device driver program using the device driver execution unit 111B.

The device driver execution unit 111B generates print data and print commands causing the printer to print based on the print instructions and data output by the application execution unit 111A, and outputs through the USB interface 112. A device driver that outputs print instructions and data to the second printer 120 is installed to the host computer 110 in this embodiment.

This USB interface 112 and the USB interfaces 121, 140, 145 described below render the physical layer, link layer, and protocol layers defined by the USB standard, and enable serial data communication between devices connected 1:1. The USB standard as used herein includes USB 1.1 to USB 3.0 and future versions and extensions.

The USB-A connector 113 of the USB interface 112 is a female connector (receptacle) with the shape and pins specified by the USB standard for a connector of the device on the host side. Standard USB cables 102A and 102B can connect to the USB-A connector 113. The USB-A connector 113 may be a mini-A or a micro-A USB connector. This also applies to the USB-A connector 146 (FIG. 5) described below. The number of USB-A connectors 113 disposed to the USB interface 112 is not specifically limited.

When a device equivalent to a USB device defined by the USB standard is connected to the USB-A connector 113, the USB host controller 114 operates as the host to this device, and can recognize the device and communicate with the device.

A device as used herein is, for example, an input/output (I/O) device that connects to another device operating as the host, and outputs data to the host as controlled by the host, or outputs data input from the host. The host is, for example, a computer that sends commands for controlling I/O devices to the connected I/O devices.

The second printer 120 is a device that has a second printer print unit 128 (second print unit) that includes a printhead, paper feed motor, conveyance rollers, and cutter unit not shown, and prints (records) text and images on cut-sheet paper, roll paper, or other print medium. The second printer 120 includes a USB interface 121 (communication unit), communication unit 126, and second printer controller 127. The communication unit 126 exchanges data with the device connected through the USB interface 121. The second printer controller 127 controls the second printer print unit 128 and prints based on data received by the communication unit 126.

The USB-B connector 122 of the USB interface 121 is a female connector with the shape and pins specified by the USB standard for a connector on the target device side. Standard USB cables 102A and 102C can connect to the USB-B connector 122. The USB-B connector 122 may be a mini-B or a micro-B USB connector. This also applies to the USB-B connector 141 (FIG. 5) described below. The USB device controller 123 operates as a USB target device as defined by the USB standard. The USB device controller 123 reports its USB device class ID and device ID to the device connected through a USB cable to the USB-B connector 122, and communicates according to the control data sent from the connected device.

The communication unit 126 receives commands and data through the USB interface 121 and temporarily stores the commands and data in the communication buffer 125. The communication unit 126 also transmits control commands and data about the status of the second printer 120 through the USB interface 121.

The second printer controller 127 reads and executes the commands stored in the communication buffer 125 in the order received. For example, when the second printer controller 127 reads a command requesting a status transmission from the communication buffer 125, the second printer controller 127 generates and sends status information describing the operating status of the second printer 120 from the communication unit 126. When a print command accompanying print data is read from the communication buffer 125, the second printer controller 127 controls the second printer print unit 128 and prints according to the command. The second printer controller 127 then generates a completion report indicating that printing ended, or an error report indicating that an error occurred, and transmits the report by means of the communication unit 126 from the USB interface 121.

The first printer 130 has two USB interfaces 140, 145. The host computer 110 connects to the USB interface 140 through USB cable 100B. The second printer 120 connects to the other USB interface 145 through USB cable 102C.

The first printer 130 includes a control unit 131 that controls communication through the USB interfaces 140, 145, a first printer print unit 160 (print unit, first print unit), and a first printer controller 132 (print control unit). The first printer print unit 160 includes a printhead, paper feed motor, conveyance rollers, and cutter unit not shown. The first printer controller 132 controls the first printer print unit 160 and prints based on data communicated by the control unit 131.

Figure 5:
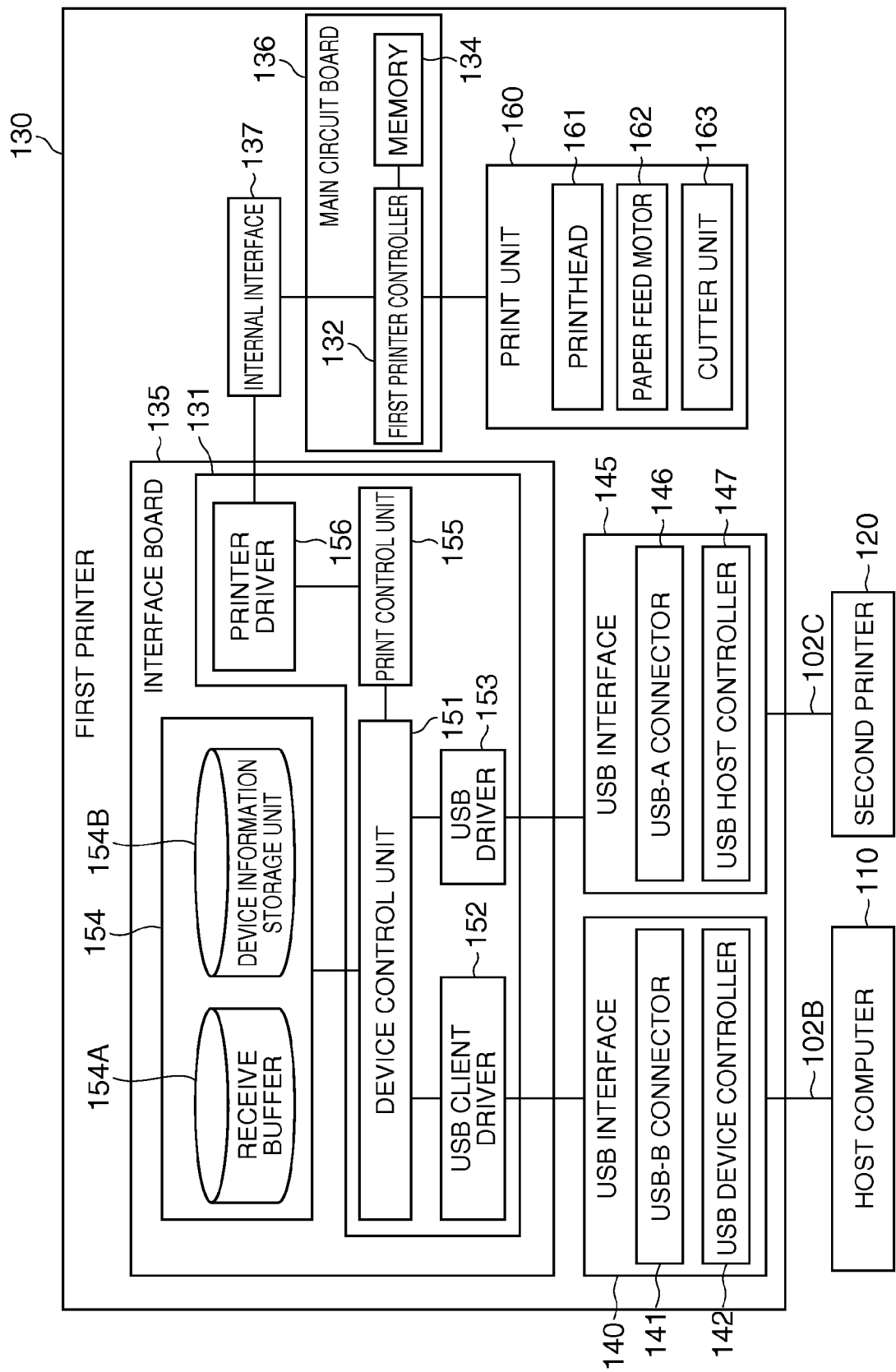
FIG. 5 is a function block diagram of the first printer.

FIG. 5 is a function block diagram of the printing system 101 showing the configuration of the first printer 130 in detail. As shown in FIG. 5, USB interface 140 (connection unit) includes a USB-B connector 141 and a USB device controller 142. The USB interface 145 (device connection unit) includes a USB-A connector 146 and a USB host controller 147.

Like USB-B connector 122, the USB-B connector 141 is a female connector with the shape and pins specified by the USB standard for a target device connector, and connects to USB cable 102B.

Like USB-A connector 113, USB-A connector 146 is a female connector with the shape and pins specified by the USB standard for a host connector. USB cable 102C connects to USB-A connector 146. The number of USB-A connectors 146 in the USB interface 145 is not specifically limited.

The USB device controller 142 reports its USB device class ID and device ID to the device connected to the USB-B connector 141, and communicates according to the control data sent from the connected device. When a USB device as defined by the USB standard is connected to the USB-A connector 146, the USB host controller 147 operates as the host device for the connected USB device, and can recognize the connected device and communicate with the device.

More specifically, the first printer 130 operates as a USB target device relative to the device connected to USB interface 140 (the host computer 110 in this embodiment). The first printer 130 also operates as a host relative to the device connected to USB interface 145 (the second printer 120 in this embodiment).

The control unit 131 includes a device control unit 151, USB client driver 152, USB driver 153, print control unit 155, and printer driver 156. The control unit 131 includes CPU, RAM, ROM, and other peripheral circuits not shown mounted on the interface board 135, and parts of the control unit 131 are achieved as software constructions as a result of the CPU running a control program. The interface board 135 also has a storage unit 154 connected to the control unit 131.

The storage unit 154 includes flash ROM mounted on the interface board 135, for example. A receive buffer 154A (print data storage unit) and device information storage unit 154B (storage unit) are created in the storage space of the storage unit 154. When the control unit 131 receives a print instruction command and data from the host computer 110 as described below, the receive buffer 154A sequentially stores the received commands and data. The device information storage unit 154B stores the USB device information (device information) that the control unit 131 sends to the host computer 110.

The control unit 131 functions as a USB client driver 152 by executing a specific driver program.

The USB client driver 152 operates as a USB device conforming to the USB standard relative to the host computer 110 connected to the USB interface 140. When the device class ID and device ID are requested by the device connected to the USB interface 140, the USB client driver 152 responds to the request. In response, the USB client driver 152 returns USB device information including the USB device class ID and device ID, and thereby enables data communication between the devices.

When the host computer 110 is connected to the USB interface 140 in this embodiment, the USB client driver 152 sends the USB device information to the host computer 110. The USB client driver 152 can output USB device information including the vendor ID of the first printer 130 manufacturer, and the device ID corresponding to the model of the first printer 130. The USB client driver 152 can also output USB device information containing the vendor ID of the second printer 120 manufacturer and the device ID corresponding to the model of the second printer 120 when this information is preset.

More specifically, the first printer 130 stores the USB device information (first device information) of the first printer 130, and the USB device information (second device information) of the second printer 120, in the device information storage unit 154B. When the device control unit 151 detects that the host computer 110 is connected to the USB interface 140, the device control unit 151 operates according to the preset setting. In this operation the device control unit 151 outputs the USB device information for the second printer 20 stored in the storage unit 154 to the USB client driver 152.

The USB client driver 152 reports this USB device information to the host computer 110. As a result, the host computer 110 recognizes that the second printer 120 is connected to the USB-A connector 113 (FIG. 4). In other words, the host computer 110 operates in the same way as when connected to the second printer 120 through USB cable 102A (FIG. 4) even though the host computer 110 is connected to the first printer 130 through USB cable 102B.

The control unit 131 functions as a USB driver 153 by running a specific device driver program. The USB driver 153 uses the USB host controller 147 and operates as a host device as defined by the USB standard for the device connected to the USB interface 145, and can recognize and communicate with the connected device.

In this embodiment the USB driver 153 is a device driver for the second printer 120, and functions to generate and output print commands and print data for the second printer 120. When the second printer 120 is connected to the USB interface 145, the USB driver 153 requests transmission of the USB device information including the device class ID and device ID from the second printer 120. The USB driver 153 thus acquires the information sent by the second printer 120 in response to this request. The USB driver 153 then enters a state enabling communication with the second printer 120. In this event, the second printer 120 operates in the same way as when connected to the host computer 110 through USB cable 102A (FIG. 4).

When a print command and print data are output from the host computer 110 connected to USB interface 140, the device control unit 151 stores the commands and data in the receive buffer 154A created in the storage unit 154.

The device control unit 151 outputs the commands and data stored in the receive buffer 154A to the print control unit 155, and outputs to the second printer 120 by means of the USB driver 153. As a result, the commands and data sent by the host computer 110 are transmitted to the second printer 120.

The first printer 130 functions as a host device for the second printer 120 by means of the USB interface 145. The second printer 120 operates according to these commands and data in the same way as when commands and data sent directly from the host are received. In other words, the second printer 120 receives the commands and data and prints in the same way as when the host computer 110 is connected to the USB interface 121 through USB cable 102A.

The first printer 130 has a main circuit board 136 (print control board) and an interface board 135 disposed separately from the main circuit board 136. The first printer controller 132 that controls the first printer print unit 160 is mounted on the main circuit board 136.

The interface board 135 can be removably installed to the first printer 130 separately from the main circuit board 136. The control unit 131, memory 133, and USB interfaces 140, 145 are mounted on the interface board 135. The parts packaged on the interface board 135, and the first printer controller 132 disposed to the main circuit board 136, are connected so that they can exchange data with each other through an internal interface 137 in the first printer 130. Power may be supplied through the internal interface 137 to the parts on the interface board 135, or power may be supplied from the interface board 135 to the main circuit board 136 in a configuration having an external power source connected to the interface board 135.

Memory 134 connects to the first printer controller 132. Memory 134 is a storage unit that temporarily stores commands and data.

As shown in FIG. 5, the first printer print unit 160 includes a printhead 161, paper feed motor 162, and cutter unit 163. The first printer print unit 160 conveys the cut-sheet paper, roll paper, or other print medium with the paper feed motor 162 as controlled by the first printer controller 132. The first printer print unit 160 also prints a character or image with the printhead 161, and cuts the printed print medium with the cutter unit 163.

The print control unit 155 (data interpreting unit) determines if the first printer 130 matches the condition for printing based on the commands and data input from the device control unit 151. If the condition is met, the print control unit 155 generates a print command and print data, and outputs to the printer driver 156.

The print control unit 155 detects, for example, if a predetermined specific string is contained in the print data sent from the host computer 110. The print control unit 155 outputs the print command and print data previously stored in the storage unit 154 linked to that string to the first printer controller 132. More specifically, when the host computer 110 operates as a POS terminal and transmits print commands and print data for printing receipts, the print control unit 155 determines if a predetermined specific product name or product classification data is contained in the print data. If the product name or product classification data is contained in the print data, the print control unit 155 outputs a print command and print data for printing a previously stored coupon to the printer driver 156.

The printer driver 156 is a device driver that drives the first printer print unit 160 and main circuit board 136 of the first printer 130, and is embodied by the control unit 131 executing a specific device driver program.

As a result of this operation, when the host computer 110 sends commands and data for printing a receipt, the second printer 120 produces a receipt according to the received commands and data. The first printer 130 also prints a coupon related to the receipt.

The host computer 110 and second printer 120 can simply operate in the same way as when they are connected directly to each other through USB cable 102A. In other words, the first printer 130 can be easily installed between the host computer 110 and the second printer 20. In this configuration, there is no need to change the application program or device driver program run by the host computer 110, or change the operating conditions of the second printer 20. A coupon related to the printed receipt can also be printed by the first printer 130 without changing the configuration of the host computer 110 and second printer 20. Receipts can also be printed with the second printer 20 in the same way.

Figure 6:
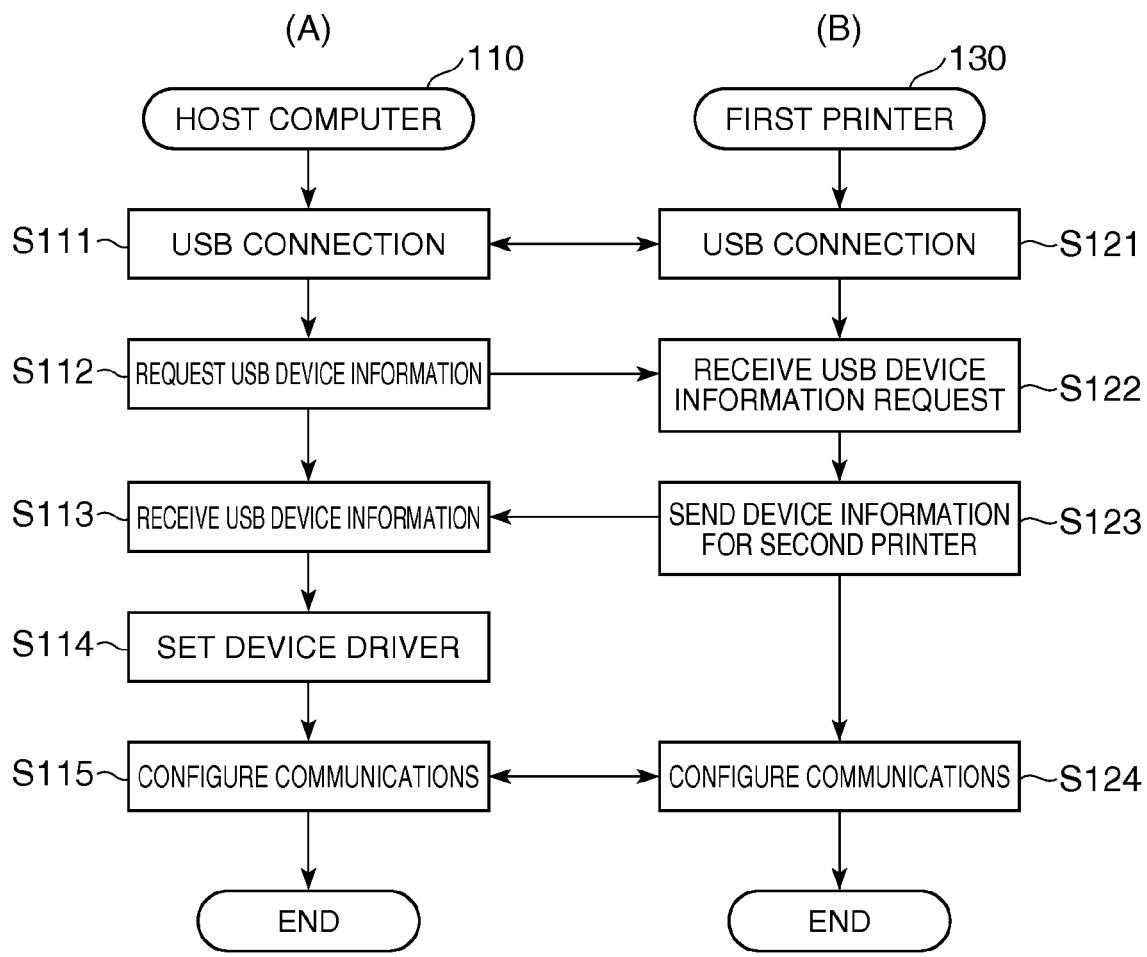
FIG. 6 is a flow chart showing the operating sequence of parts of the second embodiment.

FIG. 6 is a sequence diagram showing the operation of parts of the printing system 101, column (A) showing the operation of the host computer 110, and (B) showing the operation of the first printer 130. The operation shown in FIG. 6 is executed when the host computer 110 and first printer 130 are connected through USB cable 102B.

When the host computer 110 detects connection of a device to the USB-A connector 113 (step S111), the host computer 110 operates as a host device to the connected device, and requests the USB device information (step S112).

When the device control unit 151 of the first printer 130 detects connection of a device to the USB interface 140 (step S121), the device control unit 151 operates as a (target) device. The device control unit 151 then receives a request for USB device information sent from the host computer 110 (step S122). The device control unit 151 then reads the USB device information for the second printer 120 stored in the device information storage unit 154B, and sends the information to the host computer 110 (step S123).

The host computer 110 receives the USB device information sent from the first printer 130 (step S113). The host computer 110 then uses the device driver execution unit 111B to execute the device driver program corresponding to the received USB device information (step S114).

The host computer 110 and first printer 130 then communicate with each other through USB cable 102B (steps S115, S124) and open a command and data communication link therebetween. After the operation shown in FIG. 6, the host computer 110 recognizes the target device connected through USB cable 102B as the second printer 120.

Figure 7:
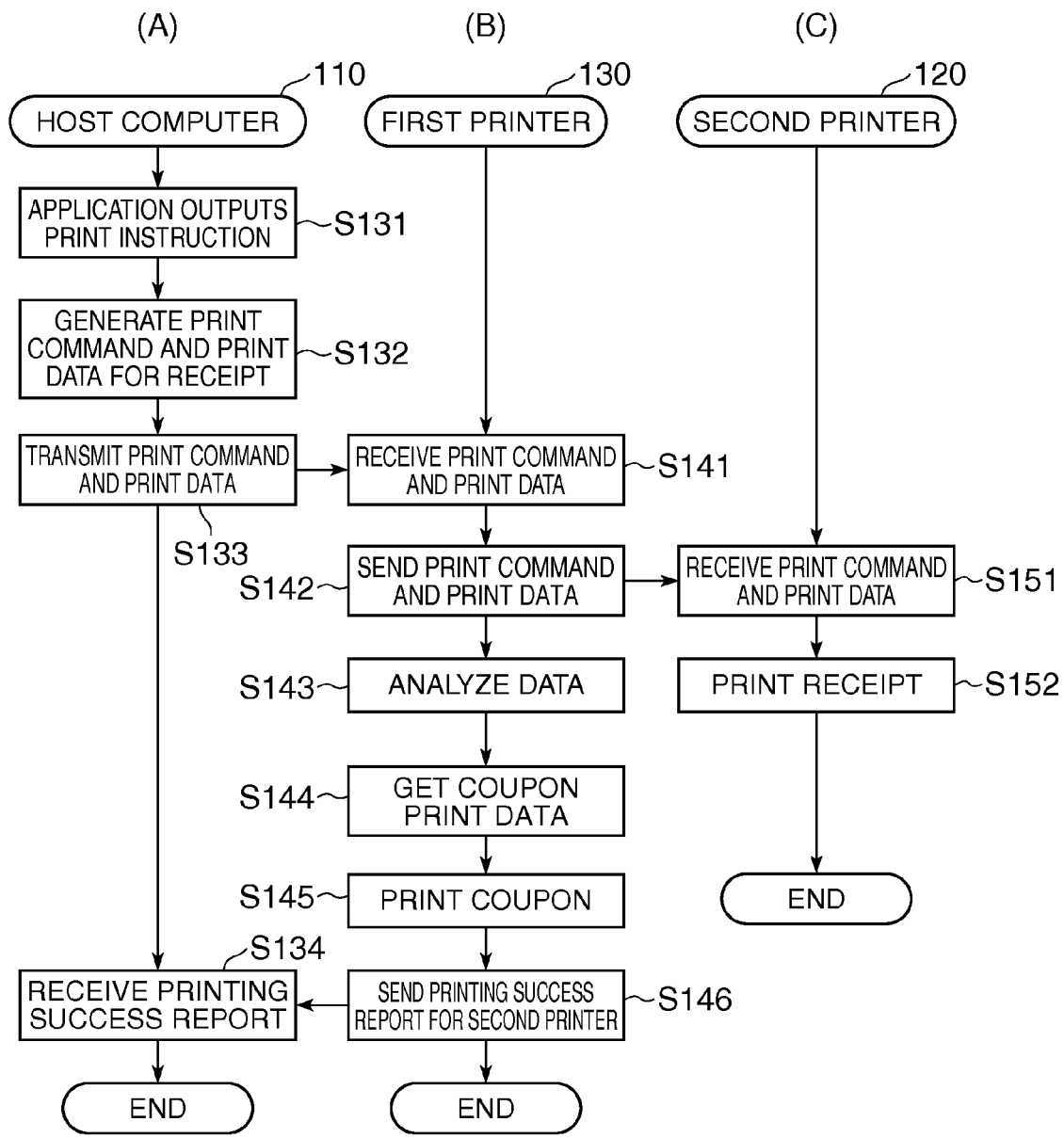
FIG. 7 is a flow chart showing the operating sequence of parts of the second embodiment.

FIG. 7 is a sequence diagram showing the operation of parts of the printing system 101, column (A) showing the operation of the host computer 110, (B) showing the operation of the first printer 130, and (C) showing the operation of the second printer 120. The operation shown in FIG. 7 is performed after the operation in FIG. 6.

When a document is created and a print instruction is output by the operation of the application execution unit 111A (step S131), the host computer 110 operates accordingly. More specifically, the device driver execution unit 111B of the host computer 110 generates a print command and print data based for operating the second printer 20 (step S132). The host computer 110 then outputs the generated print command and print data from the USB interface 112 (step S133).

The print command and print data sent by the host computer 110 is then received by the first printer 130 through the USB interface 140 (step S141). The device control unit 151 stores the print command and print data received by the USB interface 140 to the receive buffer 154A, and outputs the print command and print data from the USB interface 145 (step S142). The device control unit 151 also outputs the commands and data stored in the receive buffer 154A to the print control unit 155.

The print control unit 155 analyzes the print data stored in memory 133 (step S143). The print control unit 155 then acquires data for printing a coupon corresponding to the analyzed print data (step S144), and outputs the acquired data to the printer driver 156. The printer driver 156 outputs the data for printing a coupon through the internal interface 137 to the first printer controller 132, and a coupon is printed as controlled by the first printer controller 132 (step S145).

The print control unit 155 then generates and outputs a printing success report for the second printer 120 to the host computer 110 (step S146).

The host computer 110 receives the printing completion (success) report sent from the first printer 130 as the printing completion (success) report for the second printer 120 (step S134), and ends this process because printing ended.

The second printer 120 receives the print command and print data sent from the first printer 130 (step S151). The second printer 120 then prints a receipt as controlled by the second printer controller 127 according to the received print command and print data (step S152).

As described above, the first printer 130 according to the second embodiment of the disclosure is connected to the host computer 110, and has a first printer print unit 160, a device information storage unit 154B, a USB interface 140, and a device control unit 151. The device information storage unit 154B stores USB device information including the type of the first printer 130, and USB device information about the second printer 120, which is a different printer. The host computer 110 connects to the USB interface 140. When the host computer 110 is connected to the USB interface 140, the device control unit 151 outputs the USB device information of the second printer 120 to the host computer 110. The first printer 130 outputs the USB device information for the second printer 120 to the host computer 110, enabling the host computer 110 to recognize that the second printer 120 was connected. As a result, the printer connected to the host computer 110 can be changed from the second printer 120 to the first printer 130 without changing the configuration of the host computer 110.

When the host computer 110 outputs print commands and print data for the second printer 120, the device control unit 151 outputs those commands and data from the USB interface 145 to the second printer 120. As a result, the data output by the host computer 110 can be printed by the second printer 120.

The printing system 101 includes a host computer 110, a first printer 130, and a second printer 120. The host computer 110 outputs data. The first printer 130 has a first printer print unit 160 that prints and a connection unit that connects to the host computer 110. The second printer 120 has a USB interface 121 that connects and communicates with the first printer 130, and a second printer print unit 128 that prints.

The first printer 130 has a device information storage unit 154B that stores USB device information including the model (type) of the first printer 130, and USB device information including the model (type) of the second printer 120. When the host computer 110 requests the USB device information from the first printer 130, the first printer 130 sends the USB device information for the second printer 120 stored in the device information storage unit 154B to the host computer 110.

In this embodiment, the first printer 130 connected to the host computer 110 outputs the USB device information of the second printer 120 to the host computer 110, and can therefore be recognized by the host computer 110 as the second printer 120. As a result, the first printer 130 can be connected to a host computer 110 that is compatible with the second printer 120 without changing the configuration of the host computer 110. Therefore, the printer configuration can be changed without changing the configuration of the host computer 110 in a system having a host computer 110 and printer connected together.

Embodiments of the disclosure are described above, but the disclosure is not limited thereto and can obviously be modified and adapted as desired within the scope of the disclosure.

For example, the first embodiment describes a POS terminal 10 that runs a POS application program as the host device, but the disclosure is not so limited. The host device could run other data processes, and the process content and application of the host device are not specifically limited. A mobile terminal could be used instead of the POS terminal 10, for example. The printers could also connect wirelessly to the POS terminal 10.

The first embodiment also describes a configuration having the POS terminal 10, second printer 20, third printer 30, and first printer 60 connected through a USB interface or an Ethernet in-store LAN 90. The disclosure is not so limited, however, and other connections are possible.

The second embodiment describes a configuration having a host computer 110 connected to the USB interface 140 of a first printer 130, and a second printer 120 connected to another USB interface 145. The disclosure is not so limited, however, and the device that connects to the USB interface 140 can be any device that can operate as a host device, such as another printer or a mobile terminal device having a USB host controller. The device connected to the USB interface 145 is not specifically limited and can be any device that operates as a USB target device, such as a printer or other input/output device.

USB interface 140 and USB interface 145 are also not limited to being rendered as discrete hardware constructions. For example, USB-B connector 141 and USB-A connector 146 can be rendered in a single hardware construction having the functions of both USB device controller 142 and USB host controller 147.

The foregoing embodiments describe configurations in which the printers and print units print on cut-sheet paper or roll paper. More specifically, the second printer 20, third printer 30, first printer 60, the second printer print unit 128 of the second printer 120, and the first printer print unit 160 of the first printer 130 in the foregoing embodiments are described as printing to cut-sheet paper or roll paper, but are not specifically limited, and may print using a thermal, inkjet, dot impact, laser, or other type of printing method.

The function blocks shown in FIG. 1, FIG. 2, FIG. 4 and FIG. 5 can also be achieved through the cooperation of hardware and software, and do not suggest a specific hardware configuration. The operating sequences shown in the accompanying figures can also be achieved by parts of the foregoing embodiments executing a program stored on an externally connectable non-transitory storage medium.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

The present disclosure is directed to solving the foregoing problem, and an object of the disclosure is to enable changing the printer configuration without greatly changing the configuration of the control device in a system that controls a printer. For example, the disclosure enables changing the configuration of printers, including adding a printer and enabling one printer to substitute for another printer.

A printing system includes a host device configured to output print data; a first printing device including a connection unit configured to receive the print data output by the host device and to output the print data, and a first print unit configured to print; and a second printing device including an input unit to which the print data output by the connection unit of the first printing device is input, a second print unit configured to print the print data input to the input unit, a print control unit configured to detect an error when an error occurs in the second print unit, and an output unit that outputs the error detected by the print control unit to the connection unit of the first printing device. When an error is output by the output unit of the second printing device and input to the connection unit of the first printing device, the first printing device prints the print data with the first print unit, and reports the printing result by the first print unit as the printing result of the second printing device to the host device.

In the disclosure, print data output by the host device is input to the first printing device, and the print data is then input from the first printing device to the second printing device. If the second printing device reports an error, the first printing device prints the print data instead of the second printing device, and returns the printing result as the printing result of the second printing device to the host. The first printing device can therefore be connected in a system having the second printing device connected to the host without changing the function whereby the host controls the second printing device. In this configuration the print data is output to the second printing device, the first printing device can print based on the print data, and when the second printing device reports an error, the first printing device can substitute print for the second printing device. A printing device can therefore be added and multiple printers can be used in a printing system without greatly changing the configuration of the host device.

In a printing system, the print control unit of the second printing device detects a status of the second print unit; the output unit of the second printing device outputs the status detected by the print control unit to the connection unit of the first printing device; and the first printing device determines whether or not to output the print data input to the connection unit to the second printing device based on the status input to the connection unit.

Based on the status information output by the second printing device to the first printing device, the first printing device can appropriately determine according to the state of the second printing device whether or not to output the print data input from the host device to the second printing device. As a result, the second printing device can be appropriately operated without changing the configuration of the host device in a system in which print data output by a host device is input to a first printing device, and the first printing device then inputs the print data to the second printing device.

In a printing system, the print data output by the host device includes transaction information; and the first printing device generates a second print data based on the transaction information contained in the print data, and prints the second print data by the first print unit.

The disclosure prints data generated based on transaction information contained in the print data output by the host device, and can therefore print information other than the transaction information without changing the configuration of the host.

In a printing system, the second print data generated based on the transaction information is coupon information, and the first print unit prints a coupon.

If the host outputs print data containing transaction information, the first printing device prints a coupon based on the transaction information output by the host. Coupons can therefore be printed without changing the print data that the host outputs.

In a printing system, the first printing device includes a storage unit configured to store first device information including the first printing device type, and second device information including the second printing device type; and sends the second device information stored in the storage unit to the host device when the host device requests device information from the first printing device.

Because the first printing device connected to the host outputs the second device information for the second printing device to the host, the host can be caused to recognize the first printing device as the second printing device. The first printing device can therefore be connected to a host that is compatible with the second printing device without changing the configuration of the host. As a result, the printer configuration can be changed without changing the configuration of the host in a system having a printer connected to a host.

In a printing system, the host sends print data to be processed by the second printing device to the connection unit of the first printing device. The first printing device receives the print data sent from the host, and sends the received print data to the second printing device. The second printing device receives the print data sent from the first printing device, and prints the received print data with the second print unit.

In the disclosure, the first printing device receives print data output by the host for the second printing device, and sends the print data to the second printing device. As a result, both the first printing device and the second printing device can process the print data sent by the host device.

In a printing system, the first printing device has a data interpreter configured to analyze the print data output by the host device; and a print data storage unit configured to store preset information and print data related to the preset information; the data interpreter determines if the preset information is contained in the print data, and the first print unit prints the print data related to the preset information if the preset information is contained.

The disclosure enables connecting a first printing device to a host device compatible with a second printing device without changing the configuration of the host, and the first printing device can interpret the print data sent by the host and print related information.

In a printing system, the host device is a point-of-sale (POS) terminal configured to process payment information; and the second print unit of the second printing device prints a receipt related to the payment information based on the print data output by the POS terminal.

The disclosure enables connecting a first printing device to a POS terminal that prints receipts by a second printing device, and printing receipts with the second printing device and executing another process with the first printing device, without changing the configuration of a POS terminal.

The disclosure is a printing device having a connection unit configured to output input print data to an external printing device, and to receive the printing result of the print data; and a print unit configured to print. When the printing result of the print data input to the connection unit is an error, the print unit prints the print data and the connection unit outputs the printing result of the print unit to the host device.

The printer outputs input print data, and when the result of printing the print data is an error, reports the printing result. The printer according to the disclosure can therefore be connected between a device that is connected to an external printer and outputs print data, and the external printer. The printer can also cause the external printer to print, and when an error occurs in the external printer can substitute print for the external printer and output the printing result. A new printer can therefore be connected in addition to the external printer, and the two printers can be used to print without changing the configuration of the device that outputs the print data.

In a printing device, the input print data contains transaction information; and the printing device includes a data generating unit configured to generate data based on the transaction information contained in the input print data.

The disclosure prints data generated based on transaction information contained in the input print data, and can therefore print information other than transaction information without changing the configuration of the device that outputs the print data.

A printing device comprises a storage unit configured to store device information including the print unit type, and device information for a printing device different from the print unit; and a control unit configured to output the device information stored in the storage unit for the printing device different from the print unit by the connection unit when information requesting the device information of the print unit is input to the connection unit.

The printer stores device information including the type of the print unit, and device information about a printing device that is different from the print unit, and outputs the device information for the different printing device to the host device. When connected to the host device, the printer can therefore make the host recognize the printer as the different printing device. A printing device that is different from the printer which the host is compatible can therefore be connected to the host without changing the configuration of the host. The configuration of printers in a system to which a host device and a printing device are connected can therefore be changed without changing the configuration of the host.

The printing device has a device connection unit that is connected to the printing device and outputs data to be processed by the printing device when the data is output by the host device.

The printing device can output through the device connection unit data that is output by the host device to a different printing device. As a result, the printing device can process data output by the host device, and can also output the data to a different printing device for processing.

The disclosure is a printing control device having a connection unit configured to receive print data output by a host device and to output the input print data to a printing device or a print processing device different from the printing device; and a control unit configured to receive the printing result of the printing device when the print data is output to the printing device, and when the printing result is an error, outputs the printing result to the print processing device and returns the result of printing the print data by the print processing device as the printing result of the printing device to the host device.

The printing control device outputs input print data, and reports the printing result when the result of printing the print data is an error. As a result, the printing device of the disclosure can be connected between a device that is connected to an external printer and outputs print data, and the external printer. The printing device of the disclosure can also cause the external printer to print, and can substitute print and output the printing result when an error occurs in the external printer. A new printer can therefore be connected in addition to the external printer, and the two printers can be used to print without changing the configuration of the device that outputs the print data.

The disclosure is a printing method including: outputting print data by a host device; receiving print data by a first printing device; outputting the print data to a second printing device by the first printing device; receiving the print data output by the second printing device; outputting error information to the first printing device by the second printing device if an error occurs in the second printing device when printing the print data; printing the print data by the first printing device when the error information for the second printing device is input to the first printing device; and outputting a result of printing by the first printing device as the printing result of the second printing device to the host device.

Other objects and attainments together with a fuller understanding of the disclosure will become apparent and appreciated by referring to the following description and claims taken in conjunction with the accompanying drawings.

What is claimed is:

1. A printing system comprising:
   a host device configured to output print data;
   a first printing device including a connection unit configured to receive the print data output by the host device and to output the print data, and a first print unit configured to print; and
   a second printing device including an input unit to which the print data output by the connection unit of the first printing device is input, a second print unit configured to print the print data input to the input unit, a print control unit configured to detect an error when the error occurs in the second print unit, and an output unit configured to output the error detected by the print control unit to the connection unit of the first printing device;
   wherein when the error output by the output unit of the second printing device is input to the connection unit of the first printing device and the first printing device prints the print data with the first print unit, the first printing device reports to the host device that the second printing device printed the print data; and
   wherein, when the error output by the output unit of the second printing device is input to the connection unit of the first printing device and the first printing device cannot print the print data the first printing device reports to the host device that the second printing device cannot print the print data.

2. The printing system described in claim 1, wherein
   the print control unit of the second printing device detects a status of the second print unit;
   the output unit of the second printing device outputs the status detected by the print control unit to the connection unit of the first printing device; and
   the first printing device determines whether or not to output the print data input to the connection unit to the second printing device based on the status input to the connection unit.

3. The printing system described in claim 1, wherein
the print data output by the host device includes transaction information; and
the first printing device generates a second print data based on the transaction information contained in the print data, and prints the second print data by the first print unit.

4. The printing system described in claim 3, wherein
the second print data generated based on the transaction information is coupon information, and the first print unit prints a coupon.

5. The printing system described in claim 4, wherein
the first printing device reports to the host device after coupon printing by the first print unit.

6. The printing system described in claim 1, wherein
the first printing device
  includes a storage unit configured to store first device information including the first printing device type, and second device information including the second printing device type; and
  sends the second device information stored in the storage unit to the host device when the host device requests device information from the first printing device.

7. The printing system described in claim 3, wherein
the first printing device includes
  a data interpreter configured to analyze the print data output by the host device; and
  a print data storage unit configured to store preset information and print data related to the preset information;
the data interpreter determines if the preset information is contained in the print data, and
the first print unit prints the print data related to the preset information if the preset information is contained.

8. The printing system described in claim 3, wherein
the host device is a point-of-sale terminal configured to process payment information; and
the second print unit of the second printing device prints a receipt related to the payment information based on the print data output by the point-of-sale terminal.

9. A printing method comprising:
outputting print data by a host device;
receiving print data by a first printing device;
outputting the print data to a second printing device by the first printing device;
receiving the print data by the second printing device;
outputting error information to the first printing device by the second printing device if an error occurs in the second printing device when printing the print data;
wherein
  if the first printing device is able to print the print data when the error information for the second printing device is input to the first printing device, the method further comprises printing the print data by the first printing device and reporting by the first printing device to the host device that the second printing device printed the print data; and
  if the first printing device is not able to print the print data when the error information for the second printing device is input to the first printing device, the method further comprises reporting by the first printing device to the host device that the second printing device cannot print the print data.

* * * * *